United States Patent
Chao

(10) Patent No.: US 8,287,156 B2
(45) Date of Patent: Oct. 16, 2012

(54) COMPACT FLUORESCENT LAMP OPERABLE IN DIFFERENT POWER SOURCES

(76) Inventor: Wen-Hsin Chao, Changhua (TW)

(*) Notice: Subject to any disclaimer, the term of this patent is extended or adjusted under 35 U.S.C. 154(b) by 269 days.

(21) Appl. No.: 12/720,681

(22) Filed: Mar. 10, 2010

(65) Prior Publication Data

US 2011/0221344 A1 Sep. 15, 2011

(51) Int. Cl.
*F21V 23/02* (2006.01)

(52) U.S. Cl. ........ 362/260; 362/265; 362/310; 362/362; 362/351; 315/57; 315/58; 315/61; 315/53; 313/324

(58) Field of Classification Search .............. 315/51–58, 315/61–63, 209 R, 224, 247, 246, 276, 277, 315/291, 297, 307; 362/257, 310, 362, 363, 362/377, 378, 260, 265, 351; 313/317, 318.01, 313/324
See application file for complete search history.

(56) References Cited

U.S. PATENT DOCUMENTS

| | | | |
|---|---|---|---|
| 6,246,182 B1* | 6/2001 | Yamasaki et al. | 315/209 R |
| 6,879,117 B2* | 4/2005 | Moon | 315/294 |
| 7,692,369 B2* | 4/2010 | Morimoto et al. | 313/46 |
| 2007/0247840 A1* | 10/2007 | Ham | 362/227 |
| 2009/0001810 A1* | 1/2009 | Yoshida et al. | 307/9.1 |
| 2011/0101883 A1* | 5/2011 | Grajcar | 315/291 |
| 2012/0062133 A1* | 3/2012 | Cubias | 315/201 |

* cited by examiner

Primary Examiner — Haiss Philogene

(57) ABSTRACT

One embodiment of a compact fluorescent lamp includes a circuit assembly comprising a rectifier, a plurality of capacitors, a plurality of ICs, a plurality of inductors, a transformer for converting AC to DC, a plurality of diodes, and a PCB; a CFL electrically connected to the circuit assembly; a shade for enclosing the CFL; and a housing for mounting the circuit assembly therein. The circuit assembly is operable when voltage variation is between 2.5 and 21 V. Further, the lamp can operate in one of three different power sources (e.g., DC power supply, electronic transformer, and electrical transformer).

1 Claim, 5 Drawing Sheets

COMPACT FLUORESCENT LAMP OPERABLE IN DIFFERENT POWER SOURCES

BACKGROUND OF THE INVENTION

1. Field of Invention

The invention relates to compact fluorescent lamps and more particularly to such a compact fluorescent lamp being operable in one of three different power sources (e.g., DC power supply, electronic transformer, and electrical transformer).

2. Description of Related Art

Halogen lamps are widely used in automobiles, outdoor lighting, indoor lighting, etc. For example, as shown in FIGS. 1 and 2 it is often that at least two halogen lamps I are installed in a store window for illuminating the display of goods.

Halogen lamps may get hotter than regular incandescent lamps because the heat is concentrated on a smaller envelope surface, and because the surface is closer to an internal tungsten filament. This high temperature is essential to their operation.

However, people stayed in a room lighted by halogen lamps may feel a degree of discomfort due to the high temperature. Moreover, they are not energy saving lighting sources. Thus, the need for improvement still exists.

SUMMARY OF THE INVENTION

It is therefore one object of the invention to provide a compact fluorescent lamp comprising a circuit assembly comprising a rectifier, a plurality of capacitors, a plurality of ICs, a plurality of inductors, a transformer for converting AC to DC, a plurality of diodes, and a PCB; a CFL electrically connected to the circuit assembly; a shade for enclosing the CFL; and a housing for mounting the circuit assembly therein.

Preferably, the lamp can operate in one of three different power sources (e.g., DC power supply, electronic transformer, and electrical transformer).

The above and other objects, features and advantages of the invention will become apparent from the following detailed description taken with the accompanying drawings.

DETAILED DESCRIPTION OF THE INVENTION

Figure 1:
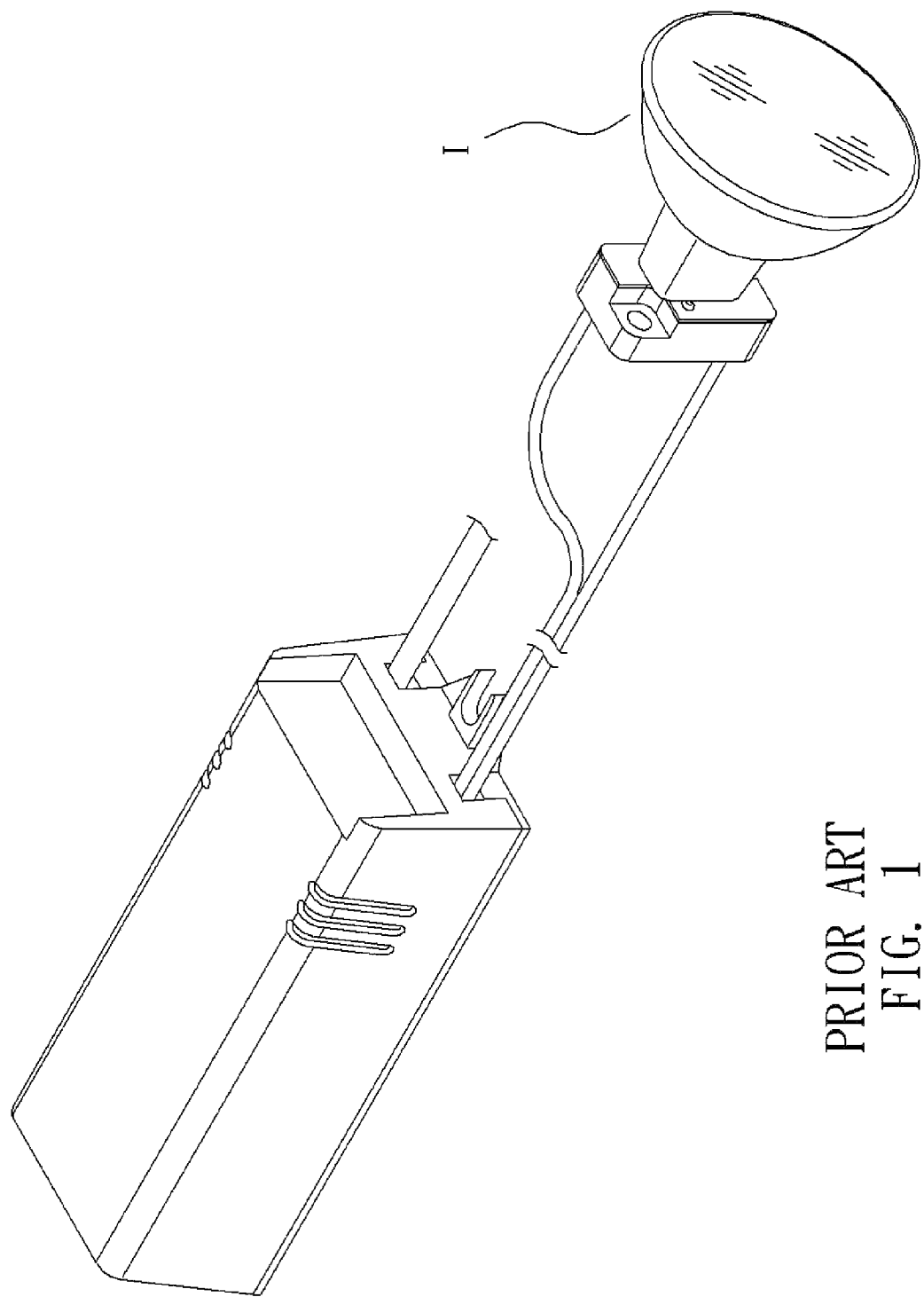
FIG. 1 is a perspective view of a conventional halogen lamp.
Figure 2:
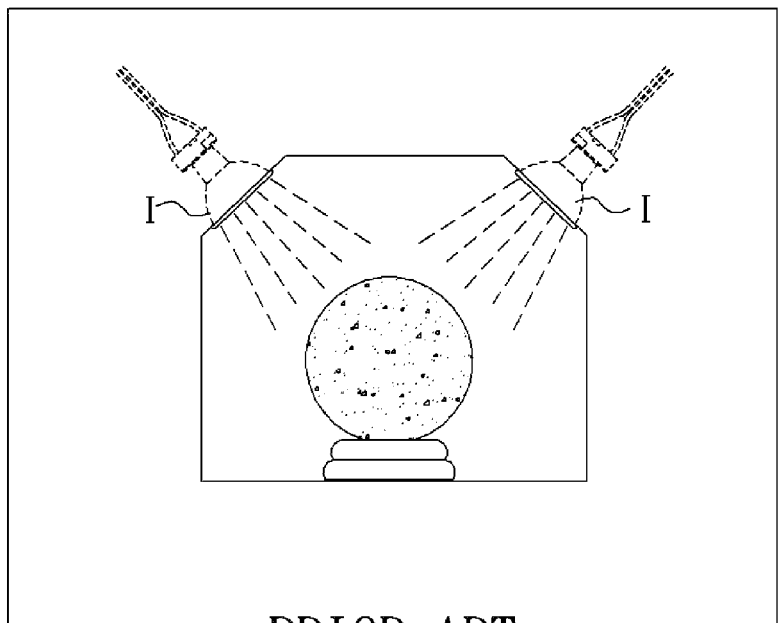
FIG. 2 is an environmental view of two halogen lamps illuminating the display of a good in a store window.
Figure 8:
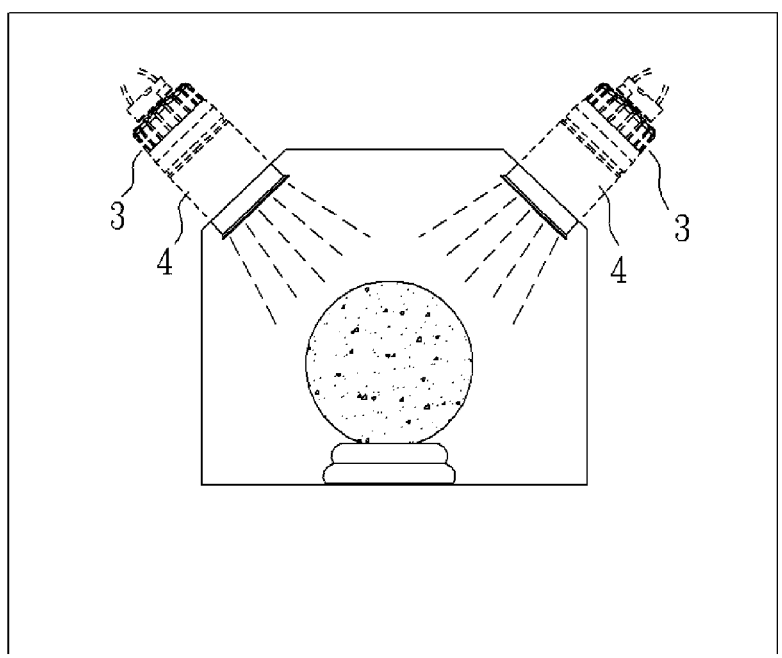
FIG. 8 is an environmental view of two compact fluorescent lamps illuminating the display of a good in a store window.
Figure 3:
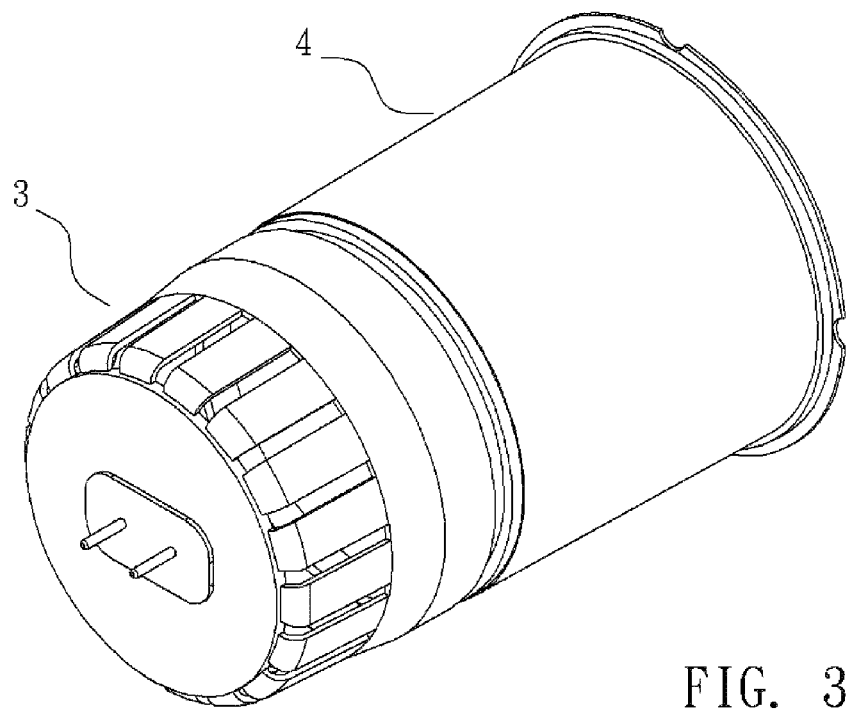
FIG. 3 is a perspective view of a compact fluorescent lamp according to the invention.
Figure 4:
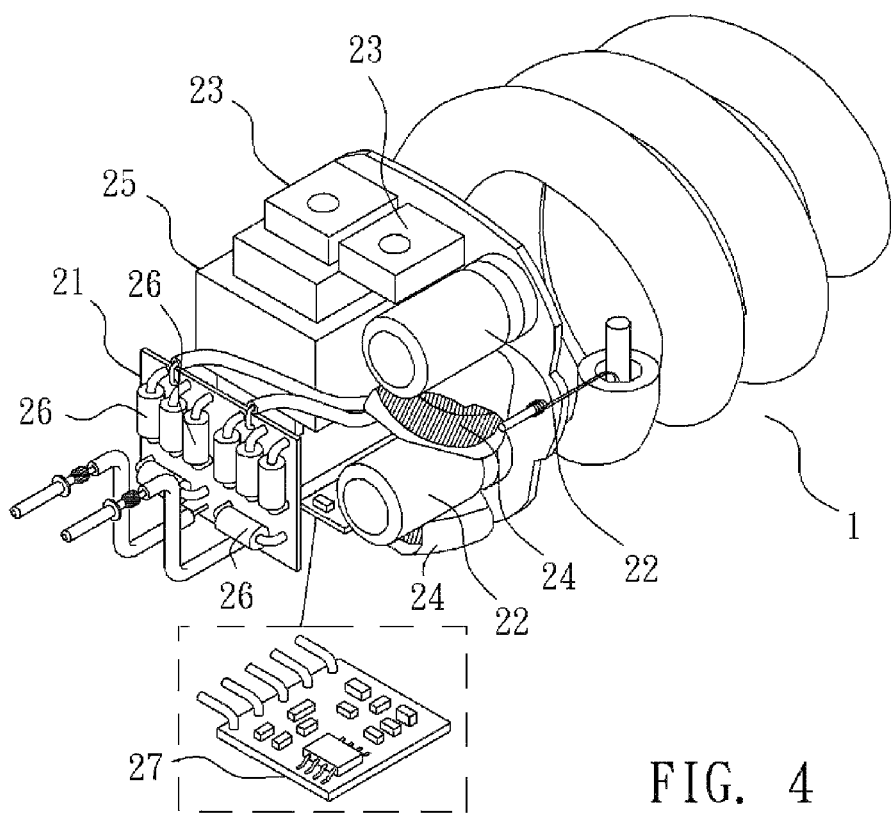
FIG. 4 is a perspective, exploded view of the compact fluorescent lamp with the shade and the housing removed.

Referring to FIGS. 3 to 8, a compact fluorescent lamp in accordance with the invention comprises the following components as discussed in detail below.

A compact fluorescent light bulb (CFL) 1 is electrically connected to a front end of a circuit assembly 2. Both the CFL 1 and the circuit assembly 2 are enclosed by a front cylindrical shade 4 and a rear cylindrical housing 3 respectively. The circuit assembly 2 as the subject of the invention is detailed below.

The circuit assembly 2 comprises a rectifier 21 for converting AC (alternating current) to DC (direct current), two capacitors 22, two ICs (integrated circuits) 23, two inductors 24, a transformer 25, a plurality of diodes 26, and a printed circuit board (PCB) 27. All above components of the circuit assembly 2 are electrically connected together.

Figure 5:
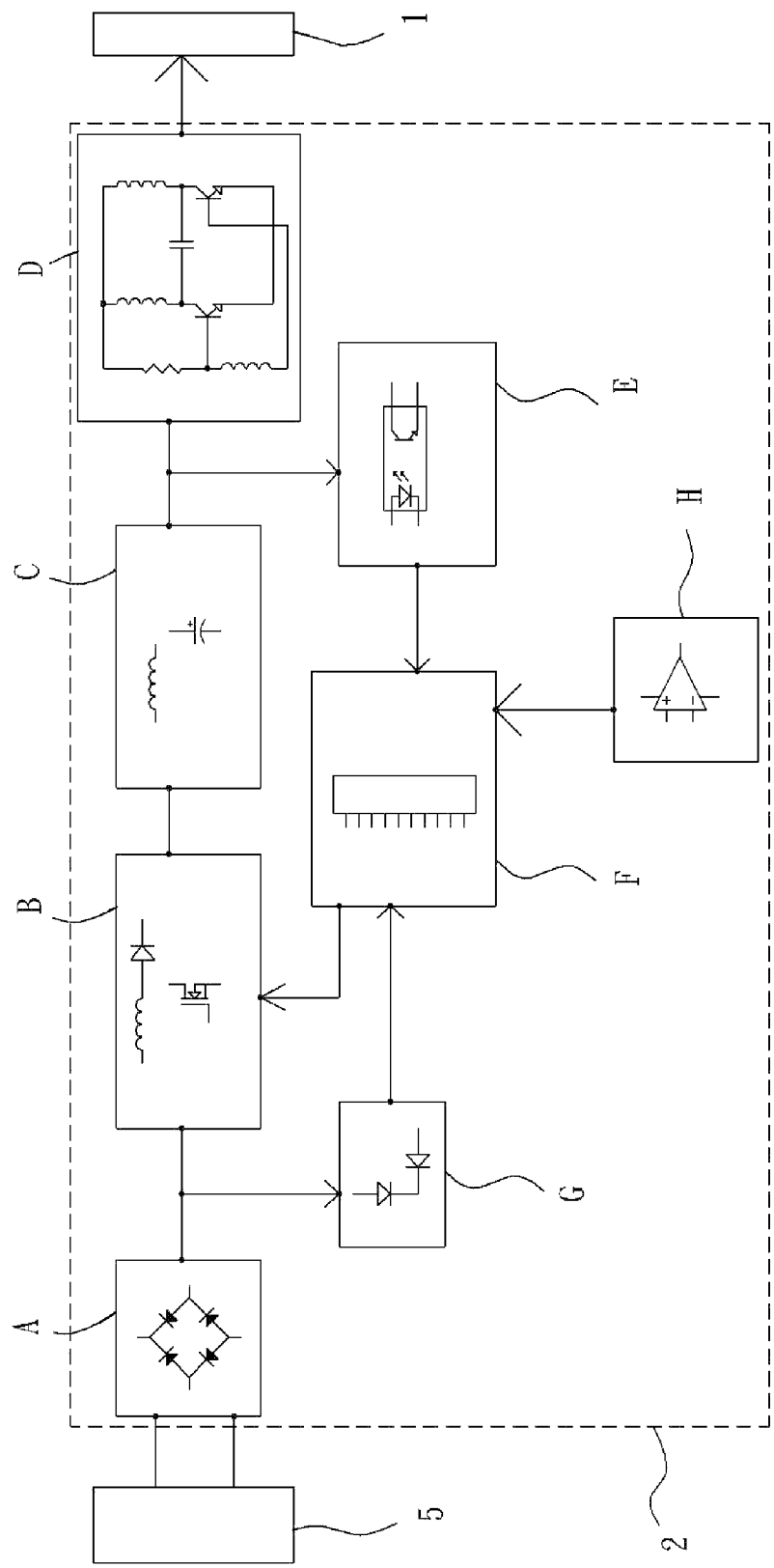
FIG. 5 is a circuit block diagram of the compact fluorescent lamp and a power supply.
Figure 6:
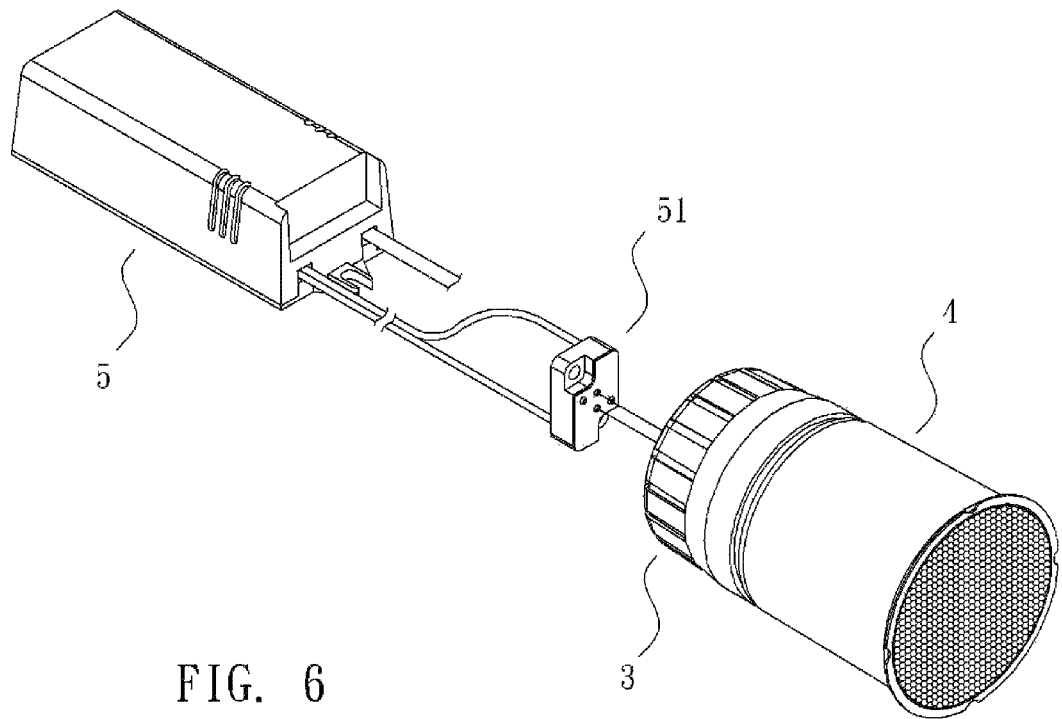
FIGS. 6 and 7 are perspective views respectively showing assembly of the compact fluorescent lamp and the power supply.
Figure 7:
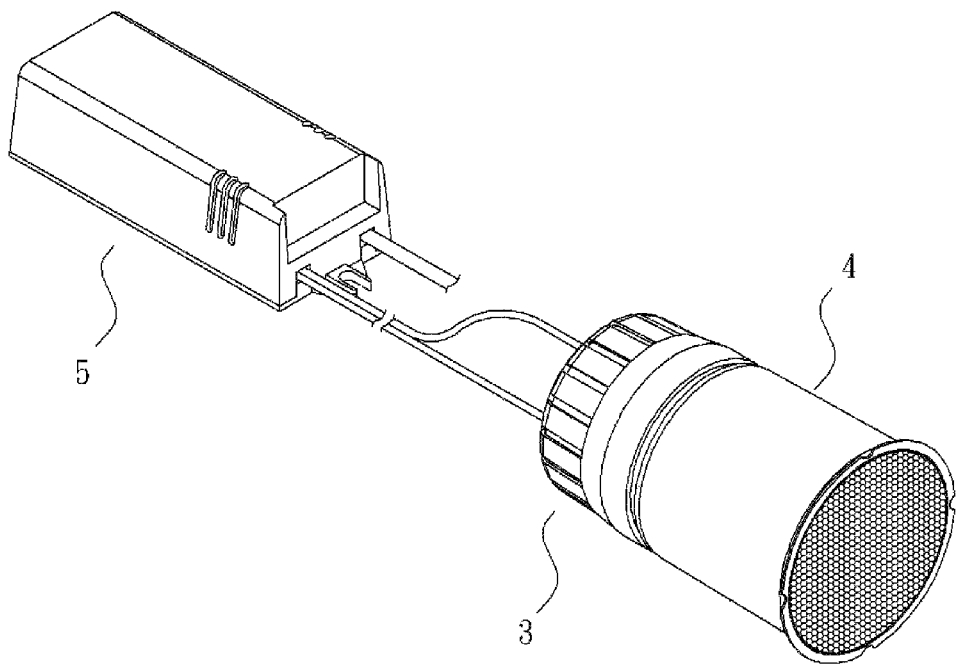

Electrical connections of the circuit assembly 2 can be explained as follows. As shown in FIG. 5, the circuit assembly 2 comprises a rectification unit A, an energy store and transfer unit B, a filter circuit C, a driving circuit D, a feedback circuit E, a pulse-width modulation (PWM) circuit F, a start up and auxiliary power supply circuit G, and a slope compensation circuit H.

In one preferred embodiment as discussed herein, a DC power supply 5 capable of converting AC into DC is provided. The DC power supply 5 has a socket 51 connected to the base of the housing 3 so that DC can be supplied from the power supply 5 to the circuit assembly 2 via the socket 51. In this case, the transformer 25 is bypassed.

Alternatively, the DC power supply 5 is replaced with an electronic transformer of high operating frequency (e.g., in the range of 18 KHz to 500 KHz) in another preferred embodiment. The electronic transformer is a step-down transformer, i.e., decreasing AC voltage and current values.

Still alternatively, the DC power supply 5 is replaced with an electrical transformer of low operating frequency in still another preferred embodiment. The electrical transformer is a step-down transformer, i.e., decreasing AC voltage and current values.

In the above two cases, the transformer 25 is activated to convert AC to DC with decreased DC voltage and current values.

Advantageously, the circuit assembly 2 can operate normally when voltage variation is in the range of 2.5 to 21 V.

In brief, the CFL 1 can illuminate normally in each of the above three power sources (i.e., DC power supply, electronic transformer, and electrical transformer).

While the invention herein disclosed has been described by means of specific embodiments, numerous modifications and variations could be made thereto by those skilled in the art without departing from the scope and spirit of the invention set forth in the claims.

What is claimed is:

1. A compact fluorescent lamp, comprising:
a circuit assembly comprising a rectifier for converting AC (alternating current) to DC (direct current), a plurality of capacitors, a plurality of ICs (integrated circuits), a plurality of inductors, a transformer, a plurality of diodes, and a PCB (printed circuit board);
a CFL (compact fluorescent light bulb) electrically connected to the circuit assembly;
a shade for enclosing the CFL; and
a housing for mounting the circuit assembly therein.

* * * * *